United States Patent
Eagleton et al.

(10) Patent No.: US 10,116,830 B2
(45) Date of Patent: Oct. 30, 2018

(54) DOCUMENT DATA PROCESSING INCLUDING IMAGE-BASED TOKENIZATION

(71) Applicant: ACCENTURE GLOBAL SOLUTIONS LIMITED, Dublin (IE)

(72) Inventors: Michael Roger Eagleton, Flintshire (GB); Clara Fletcher, London (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 102 days.

(21) Appl. No.: 15/266,611

(22) Filed: Sep. 15, 2016

(65) Prior Publication Data

US 2018/0077313 A1    Mar. 15, 2018

(51) Int. Cl.

| | |
|---|---|
| H04N 1/32 | (2006.01) |
| H04L 29/06 | (2006.01) |
| H04W 12/06 | (2009.01) |
| G06F 17/30 | (2006.01) |
| H04N 1/00 | (2006.01) |
| H04N 1/04 | (2006.01) |
| G06K 9/00 | (2006.01) |
| G06F 21/60 | (2013.01) |
| G06K 9/20 | (2006.01) |
| G06K 9/46 | (2006.01) |
| H04L 9/06 | (2006.01) |

(52) U.S. Cl.
CPC ... *H04N 1/32272* (2013.01); *G06F 17/30011* (2013.01); *G06F 21/60* (2013.01); *G06K 9/00442* (2013.01); *G06K 9/00577* (2013.01); *G06K 9/2063* (2013.01); *G06K 9/46* (2013.01); *H04L 63/083* (2013.01); *H04L 63/123* (2013.01); *H04N 1/00867* (2013.01); *H04N 1/00875* (2013.01); *H04N 1/04* (2013.01); *H04W 12/06* (2013.01); *G06K 2009/0059* (2013.01); *H04L 9/0643* (2013.01)

(58) Field of Classification Search
CPC .................................................. G06F 17/30011
See application file for complete search history.

(56) References Cited

U.S. PATENT DOCUMENTS 5,508,713 A * 4/1996 Okouchi ............... G06F 3/0481
                                                    345/2.2
5,611,630 A * 3/1997 Dolan ....................... B41J 2/36
                                                    347/188

(Continued)

FOREIGN PATENT DOCUMENTS

| CN | 101561863 | 10/2009 |
| CN | 102270294 | 12/2011 |

(Continued)

OTHER PUBLICATIONS

Anonymous: Padding (Cryptography)—Wikipedia, the free encyclopedia, Sep. 28, 2012, Retrieved from the Internet on Nov. 24, 2014.

(Continued)

*Primary Examiner* — Ted Barnes
(74) *Attorney, Agent, or Firm* — Mannava & Kang, P.C.

(57) ABSTRACT

A system may capture an image of a physical item, perform digital image processing to identify features of the physical item from the image, and generate a digital token for the physical item based on the digital image processing.

17 Claims, 5 Drawing Sheets

(56) References Cited

U.S. PATENT DOCUMENTS

| | | | | |
|---|---|---|---|---|
| 5,829,895 A * | 11/1998 | Hayashi | | G06K 1/121 |
| | | | | 400/124.05 |
| 6,069,955 A * | 5/2000 | Coppersmith | | G06Q 10/087 |
| | | | | 380/200 |
| 6,313,787 B1 | 11/2001 | King et al. | | |
| 6,314,518 B1 * | 11/2001 | Linnartz | | G06T 1/0085 |
| | | | | 375/E7.001 |
| 6,402,030 B1 * | 6/2002 | Summers | | G06Q 20/342 |
| | | | | 235/375 |
| 6,987,868 B1 | 1/2006 | Atarashi et al. | | |
| 6,996,543 B1 | 2/2006 | Coppersmith et al. | | |
| 7,051,364 B1 * | 5/2006 | Tackman | | G06Q 50/188 |
| | | | | 705/80 |
| 7,283,630 B1 * | 10/2007 | Doljack | | G06K 17/00 |
| | | | | 380/55 |
| 7,364,074 B2 | 4/2008 | He et al. | | |
| 7,515,289 B2 * | 4/2009 | Ohtuka | | H04N 1/00209 |
| | | | | 348/207.1 |
| 7,877,289 B1 * | 1/2011 | Cunningham | | G06Q 30/02 |
| | | | | 705/14.26 |
| 8,322,846 B2 * | 12/2012 | Smoyer | | B41J 29/13 |
| | | | | 235/375 |
| 8,442,844 B1 * | 5/2013 | Trandal | | G06Q 30/012 |
| | | | | 705/35 |
| 8,533,045 B1 * | 9/2013 | Cunningham | | G06Q 30/02 |
| | | | | 705/14.47 |
| 8,666,841 B1 | 3/2014 | Claridge et al. | | |
| 8,677,132 B1 * | 3/2014 | Liao | | H04L 9/0888 |
| | | | | 713/176 |
| 9,009,805 B1 * | 4/2015 | Kirkby | | G06K 9/00711 |
| | | | | 726/7 |
| 9,124,749 B2 * | 9/2015 | Tomizawa | | H04N 1/00925 |
| 9,369,287 B1 * | 6/2016 | Sarvestani | | G06F 21/608 |
| 2001/0029483 A1 * | 10/2001 | Schultz | | G06Q 20/0453 |
| | | | | 705/39 |
| 2002/0099843 A1 | 7/2002 | Fruchtman et al. | | |
| 2002/0127040 A1 * | 9/2002 | Davies | | G06K 15/02 |
| | | | | 400/76 |
| 2003/0167235 A1 | 9/2003 | McKinley et al. | | |
| 2003/0182475 A1 * | 9/2003 | Gimenez | | G06F 21/10 |
| | | | | 710/8 |
| 2003/0234718 A1 | 12/2003 | Fujisawa et al. | | |
| 2004/0112962 A1 * | 6/2004 | Farrall | | G06K 7/12 |
| | | | | 235/462.01 |
| 2005/0038756 A1 * | 2/2005 | Nagel | | G06K 19/086 |
| | | | | 705/76 |
| 2005/0060171 A1 | 3/2005 | Molnar | | |
| 2005/0069171 A1 * | 3/2005 | Rhoads | | G06Q 30/02 |
| | | | | 382/100 |
| 2006/0026268 A1 | 2/2006 | Sanda | | |
| 2006/0059574 A1 * | 3/2006 | Fayad | | G06F 21/76 |
| | | | | 726/34 |
| 2006/0095289 A1 * | 5/2006 | Bunning | | G06Q 10/00 |
| | | | | 705/302 |
| 2007/0033108 A1 * | 2/2007 | Luhr | | G06Q 20/203 |
| | | | | 705/22 |
| 2007/0075168 A1 * | 4/2007 | Rodriguez | | B02C 18/0007 |
| | | | | 241/36 |
| 2007/0083649 A1 | 4/2007 | Zuzga et al. | | |
| 2007/0119918 A1 | 5/2007 | Hogg et al. | | |
| 2007/0175974 A1 | 8/2007 | Self et al. | | |
| 2007/0251989 A1 * | 11/2007 | Grossman | | A63F 3/065 |
| | | | | 235/375 |
| 2007/0263912 A1 | 11/2007 | Biarnes et al. | | |
| 2008/0011841 A1 | 1/2008 | Self et al. | | |
| 2008/0074682 A1 * | 3/2008 | Komatsubara | | G06T 1/0071 |
| | | | | 358/1.1 |
| 2008/0110972 A1 * | 5/2008 | Grossman | | A63F 3/065 |
| | | | | 235/375 |
| 2008/0163364 A1 * | 7/2008 | Ferlitsch | | G06F 17/30011 |
| | | | | 726/21 |
| 2008/0209512 A1 | 8/2008 | Silverbrook et al. | | |
| 2008/0244385 A1 * | 10/2008 | Zukowski | | G06F 17/241 |
| | | | | 715/255 |
| 2008/0301011 A1 * | 12/2008 | Monk | | G06Q 10/087 |
| | | | | 705/28 |
| 2008/0312851 A1 | 12/2008 | Kagan et al. | | |
| 2009/0087076 A1 * | 4/2009 | Jenrick | | G07D 7/00 |
| | | | | 382/135 |
| 2009/0144199 A1 | 6/2009 | Oertel | | |
| 2009/0177470 A1 | 7/2009 | Beach et al. | | |
| 2009/0251724 A1 * | 10/2009 | Nakajima | | G06F 21/608 |
| | | | | 358/1.15 |
| 2009/0257101 A1 | 10/2009 | Gurak | | |
| 2009/0283583 A1 | 11/2009 | Cowburn et al. | | |
| 2009/0286570 A1 | 11/2009 | Pierce, Jr. | | |
| 2009/0327008 A1 | 12/2009 | Collins et al. | | |
| 2010/0019026 A1 | 1/2010 | Hochfield et al. | | |
| 2010/0131592 A1 | 5/2010 | Zhang et al. | | |
| 2010/0179857 A1 | 7/2010 | Kalaboukis et al. | | |
| 2010/0266163 A1 * | 10/2010 | Evevsky | | G06K 9/036 |
| | | | | 382/112 |
| 2011/0016008 A1 * | 1/2011 | Maraz | | G06Q 20/202 |
| | | | | 705/21 |
| 2011/0093113 A1 | 4/2011 | Sager et al. | | |
| 2011/0107100 A1 | 5/2011 | Loeken | | |
| 2011/0122459 A1 * | 5/2011 | Do | | H04N 1/00795 |
| | | | | 358/474 |
| 2011/0125658 A1 | 5/2011 | Lanxner et al. | | |
| 2011/0133887 A1 * | 6/2011 | Tian | | G06K 9/2063 |
| | | | | 340/5.86 |
| 2011/0153512 A1 | 6/2011 | Peckover | | |
| 2011/0167010 A1 | 7/2011 | Soppera et al. | | |
| 2011/0200256 A1 | 8/2011 | Saubat et al. | | |
| 2011/0231316 A1 | 9/2011 | Carroll, III | | |
| 2012/0024956 A1 | 2/2012 | Chen | | |
| 2012/0047080 A1 * | 2/2012 | Rodatos | | G06Q 10/30 |
| | | | | 705/308 |
| 2012/0106851 A1 | 5/2012 | Lei | | |
| 2012/0158541 A1 | 6/2012 | Ganti et al. | | |
| 2012/0215704 A1 | 8/2012 | Simpson et al. | | |
| 2012/0272221 A1 | 10/2012 | Pessoa et al. | | |
| 2013/0067216 A1 * | 3/2013 | Tanner | | H04L 9/3234 |
| | | | | 713/155 |
| 2013/0124614 A1 | 5/2013 | Yakoyama et al. | | |
| 2013/0170758 A1 | 7/2013 | Venkatesh | | |
| 2013/0173484 A1 | 7/2013 | Wesby | | |
| 2013/0278622 A1 * | 10/2013 | Sun | | G06Q 20/22 |
| | | | | 345/589 |
| 2013/0290379 A1 | 10/2013 | Rhoads et al. | | |
| 2013/0297512 A1 | 11/2013 | Phillips et al. | | |
| 2014/0012901 A1 | 1/2014 | Eberlein et al. | | |
| 2014/0029073 A1 | 1/2014 | Wang et al. | | |
| 2014/0095398 A1 | 4/2014 | Lin | | |
| 2014/0132799 A1 | 5/2014 | Kim et al. | | |
| 2014/0214758 A1 * | 7/2014 | Tripathi | | G06F 17/30011 |
| | | | | 707/608 |
| 2014/0298477 A1 * | 10/2014 | Castro | | G06F 21/606 |
| | | | | 726/26 |
| 2015/0026074 A1 * | 1/2015 | Cotten | | G06Q 30/012 |
| | | | | 705/302 |
| 2015/0089615 A1 * | 3/2015 | Krawczyk | | G06F 21/31 |
| | | | | 726/7 |
| 2015/0302421 A1 * | 10/2015 | Caton | | G06Q 30/018 |
| | | | | 705/17 |
| 2015/0324839 A1 * | 11/2015 | Shariff | | G06Q 30/0247 |
| | | | | 705/14.46 |
| 2016/0342983 A1 * | 11/2016 | Thomas | | G06Q 20/401 |
| 2017/0039422 A1 * | 2/2017 | Eschbach | | G06F 21/64 |
| 2017/0116475 A1 | 4/2017 | Nepomniachtchi et al. | | |
| 2017/0132621 A1 * | 5/2017 | Miller | | G06Q 20/3829 |
| 2017/0287090 A1 * | 10/2017 | Hunn | | G06Q 50/18 |
| 2018/0033016 A1 * | 2/2018 | Mayman | | G06Q 30/012 |

FOREIGN PATENT DOCUMENTS

| | | |
|---|---|---|
| DE | 102006016830 | 10/2007 |
| EP | 1575002 | 9/2005 |

(56) References Cited

FOREIGN PATENT DOCUMENTS

| | | |
|---|---|---|
| JP | 2000-232578 | 8/2000 |
| WO | 97/25798 | 7/1997 |
| WO | 2009/074866 | 6/2009 |

OTHER PUBLICATIONS

Sameera Khan et al: "A Review on Offline Signature Recognition and Verification Techniques", International Journal of Advanced Research in Computer and Communication Engineering, Jun. 2, 2014, pp. 6879-6882.

Diaz-Santiago Sandra et al., "A cryptographic study of tokenization systems", International Journal of Information Security (IJIS), Heidelberg, DE, vol. 15, No. 4, Jan. 22, 2016, pp. 413-432.

Jiang C. et al., "Shadow identification", Proceedings of the Computer Society Conference on Computer Vision and Pattern Recognition. Jun. 15, 1992, pp. 606-612.

\* cited by examiner

DOCUMENT DATA PROCESSING INCLUDING IMAGE-BASED TOKENIZATION

BACKGROUND

Document management systems are often used to store and manage large volumes of documents. Typically these systems digitize and store paper documents. For example, digitizing may include converting documents, e.g., paper documents, hard copies, etc., into a digital form. A scanner may be used to scan the document. Typically, optical scanners are used to capture an image of the document. For example, charged-coupled devices (CCDs) convert light to pixels to capture an electronic image of a document. Other types of scanners may be used. The scanners may be provided in many forms, including flatbed scanners, hand-held scanners, etc. Once the document are in digital form, the digitized documents may be stored, processed and electronically managed, such as by providing remote access to stored documents, facilitating document searching, controlling access to documents, sharing stored documents, etc.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means including but not limited to, and the term "based on" means based at least in part on.

According to an example of the present disclosure, a system is disclosed that can tokenize physical documents. To tokenize a physical document or to perform tokenization of a physical document includes generating a token for the physical document. The token may include a digital value that represents the document or information contained and/or associated with the physical document. Each token may be unique, so no two documents are represented by the same token and no two tokens can represent a single document. A cryptographic function may be used to generate the token based on unique features of the document determined from an image of the document. A physical document may include a tangible document, such as a paper, textile-based, etc., document.

In an example, an application running on a mobile device, which may be in communication with a server over a network, can be used to validate a physical document, and to perform image-based tokenization of the physical document to generate a token for the physical document. An image capture device, which may be part of the mobile device, can capture an image of the physical document, and the image is processed to identify features of the physical document, including unique features of the physical document. Validity of the document may be determined from one or more of the identified features, and tokenization of the physical document may be performed based on one or more of the identified unique features of the physical document. According to an example, at least one of the unique features, which may be determined from the image, may be provided as input to a cryptographic function to generate the unique token for the physical document. Specialized encryption techniques may be used that, for example, allow for one way tokenization such that a token cannot be used to facilitate creating a new, or duplicate, physical document.

The system may include a database for storing the tokens and related information. The related information may include information about the physical documents and/or information about the owner or user of the physical documents. The database may include a secure, central database that stores the tokens and related information, and the database may be accessed to perform various operations involving the tokens as is further discussed below.

A technical aspect of the present disclosure is related to document security through tokenization. According to an example, a token for a physical document may be generated, but the token may not be released to the user until destruction of the physical document is verified, which may include an image-based verification. By way of example, the verification of destruction of the physical document may be performed so that the document may exist in digital form, such as a token, or in physical form, but not in both digital and physical form. This can minimize fraudulent use of the document as may occur if a token was created and in use but the physical document still existed in a usable form.

Another technical aspect is the generation of the token based on image recognition of unique features of the physical document. This allows a unique token to be generated for each physical document. Furthermore, the token is secure and tamper resistant. For example, a cryptographic function may be used to generate the token based on the unique features of the physical document. Furthermore, the tokenization of a physical document can be performed by the holder of the physical document in situ, such as using a mobile application or a local terminal or computer. The physical document does not need to be presented at a central place of conversion to perform the tokenization.

Examples of the present disclosure may be used to tokenize substantially any type of physical document. The physical document may include one or more unique features that distinguish the document from other documents. In an example, the physical document may be a ticket, and the ticket includes a unique, visually-recognizable identifier that distinguishes the ticket from other tickets for the same event, such as a serial number, bar code, watermark, etc. The system may be used to generate a token for any number of tickets, or documents, for the same event. Here the token is unique among other tokens generated for tickets for the same event such that the tickets represented by the token cannot be used more than once for the event. A token for a ticket may be generated by the purchaser of the ticket, and the token may be transferred to another person if desired to allow the other person access to the event. The system may verify destruction of the physical ticket prior to allowing the token to be transferred, so multiple versions (e.g., digital and physical) of the same ticket cannot be used. In another example, the physical documents may include paper currency, such as dollar bills, bonds, stock certificates, or any form of paper currency, and the system may be used to tokenize the paper currency as is further discussed below.

Figure 1:
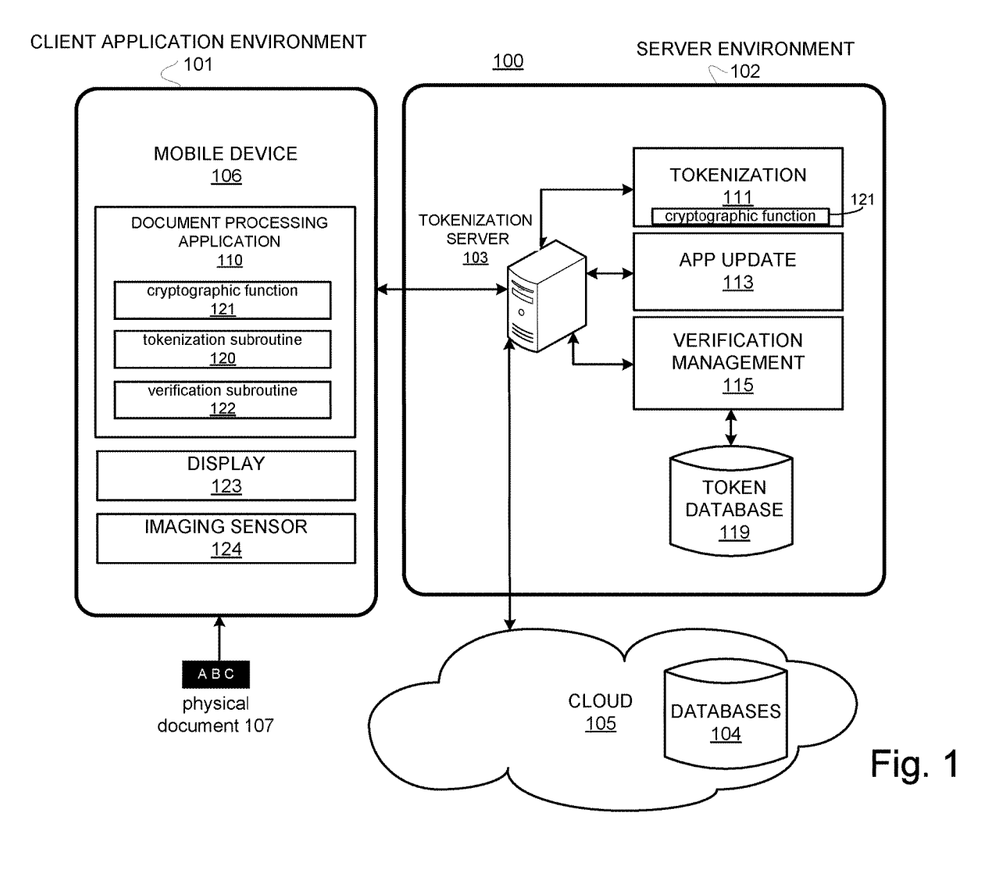
FIG. 1 illustrates a system, according to an example of the present disclosure.

FIG. 1 illustrates a document processing system 100 according to an example of the present disclosure. The document processing system 100, also referred to as the system 100, performs tokenization of physical documents and other operations described in the present disclosure. The system 100 may include one or more of a client application environment 101 and a server environment 102.

The client application environment 101 may include but is not limited to a mobile device 106, such as, for example, a smart phone, a tablet, a laptop, etc. Instead of a mobile device, a stationary computer may be used.

The mobile device 106 may store and execute a document processing application 110 to facilitate tokenization of physical documents, such as physical document 107, and to perform verifications related to the physical documents, including verification of document validity, verification of document destruction, and authentication of users associated with the physical documents. The document processing application 110 may comprise machine readable instructions stored on a non-transitory machine readable medium that are executable by a processor. In an example, the machine readable instructions may include a tokenization subroutine 120 to tokenize physical documents and verification subroutine 122 to perform the verifications. A cryptographic function 121 may be used to generate tokens for physical documents according to examples discussed below.

Imaging sensor 124 may include one or more complementary metal-oxide semiconductor (CMOS) sensors or charge-coupled device (CCD) sensors or any other suitable sensor for a digital camera, which may be used to capture digital images of the physical documents, including the physical document 107. For example, the imaging sensor 124 converts light to pixels to capture electronic images of the physical document 107. The imaging sensor 124 may be part of the mobile device 106 or may be provided in a separate device.

To tokenize the physical document 107, the document processing application 110 is launched, and may prompt a user via display 123 to capture an image of the physical document 107. For example, the document processing application 110 may generate a graphical user interface in the display 123 that allows a user to select an option to tokenize a physical document. The user may select the option via the display 123, and the document processing application 110 controls the imaging sensor 124 to capture an image of the physical document 107. For image capture, a preview mode may be invoked to allow previewing the image prior to capture. For example, previewing allows the user to frame the physical document 107 for image capture. The user may click a button on the graphical user interface to capture an image of the physical document 107.

The document processing application 110 identifies one or more unique features of the physical document 107 from the image, which may be used for tokenization or verification. For example, one or more unique features may include a serial number, a bar code, watermark, or some other marking from the image. This information may be used to verify the validity of the document, such as whether the serial number or marking corresponds to a valid ticket or valid currency. Also, a unique feature identified from the image may be applied to the cryptographic function 121 to generate the token for the physical document 107. For example, the unique feature extracted from the image may be converted or used as a unique feature identifier for the physical document 107. The unique feature may include a feature that uniquely identifies the physical document 107 from other physical documents. For example, if the physical document 107 is a ticket for an event, the unique feature may include a serial number. A different serial number may be issued for each ticket for the event. Similarly, paper currency may have a unique serial number. The serial number is extracted from the image of the physical document 107, and the tokenization subroutine 120 may provide the serial number as input to the cryptographic function 121 to determine the token for the physical document 107.

The verification subroutine 122 may perform verifications including verification of document validity. For example, a serial number or another unique feature identified from the captured image of the physical document 107 may be used to verify the validity of the physical document 107 prior to generating the token. In an example, the serial number may be compared to a database of valid serial numbers to verify validity. If no match exists, then the physical document 107 may be counterfeit. Another verification may include verification of document destruction. For example, the token may be used in lieu of the physical document 107 for operations or transactions that are typically performed with the physical document 107. If the token is generated for the physical document 107, the system 100 may verify that the physical document 107 is destroyed so that operations or transactions cannot be performed with both the token and the physical document 107. For example, both a physical ticket and its token cannot be used to gain entry into an event by two different people. Feature detection of an image captured of the physical document after it has been modified or destroyed may be performed to verify document destruction.

The server environment 102 may include tokenization server 103. The tokenization server 103 may include one or more devices that perform provide tokenization capabilities 111, application update operations 113 and verification management 115. For example, one or more digital images of the physical document 107 may be sent to the tokenization server 103 for tokenization rather than being performed at the mobile device 106. Tokenization 111 may be performed similarly to tokenization performed by the document processing application 110, such as by providing one or more unique features from the image of the physical document 107 as input to the cryptographic function 121 to generate the token. Token database 119 may store tokens generated for physical documents and store other information related to the physical documents and users. The token database 119 may store information for performing verifications, such as verification patterns and rules for verifying modifications to physical documents. The application update operations 113 may include updating document processing applications on remote devices, such as mobile device 106. Updates may include updates to rules or other information for performing the operations of the document processing application 110. The verifications performed by the verification subroutine 122 may instead be performed by the verification management 115 or may be performed in conjunction with the verification management 115. Also, the verification management 115 may include performing operations in response to verifying modifications, such as notifying external systems that documents are verified. The tokenization server 103 may communicate with further servers (not shown) and databases 104 in a cloud 105 to perform its operations or the tokenization server 103 may be a server in the cloud 105. Also, the token database 119 may be a database in the cloud 105 that is connectable by multiple tokenization servers, which may be geographically distributed. Operations performed by the tokenization server 103, including tokenization 111, application update operations 113, and verification management 115, may be embodied as machine readable instructions stored on a non-transitory computer readable medium, which are executable by a processor. In addition, or alternatively, hardware or a combination of machine readable instructions executable by a processor and other hardware may perform the operations and functions of the tokenization server 103 and/or other components of the system 100.

Figure 2:
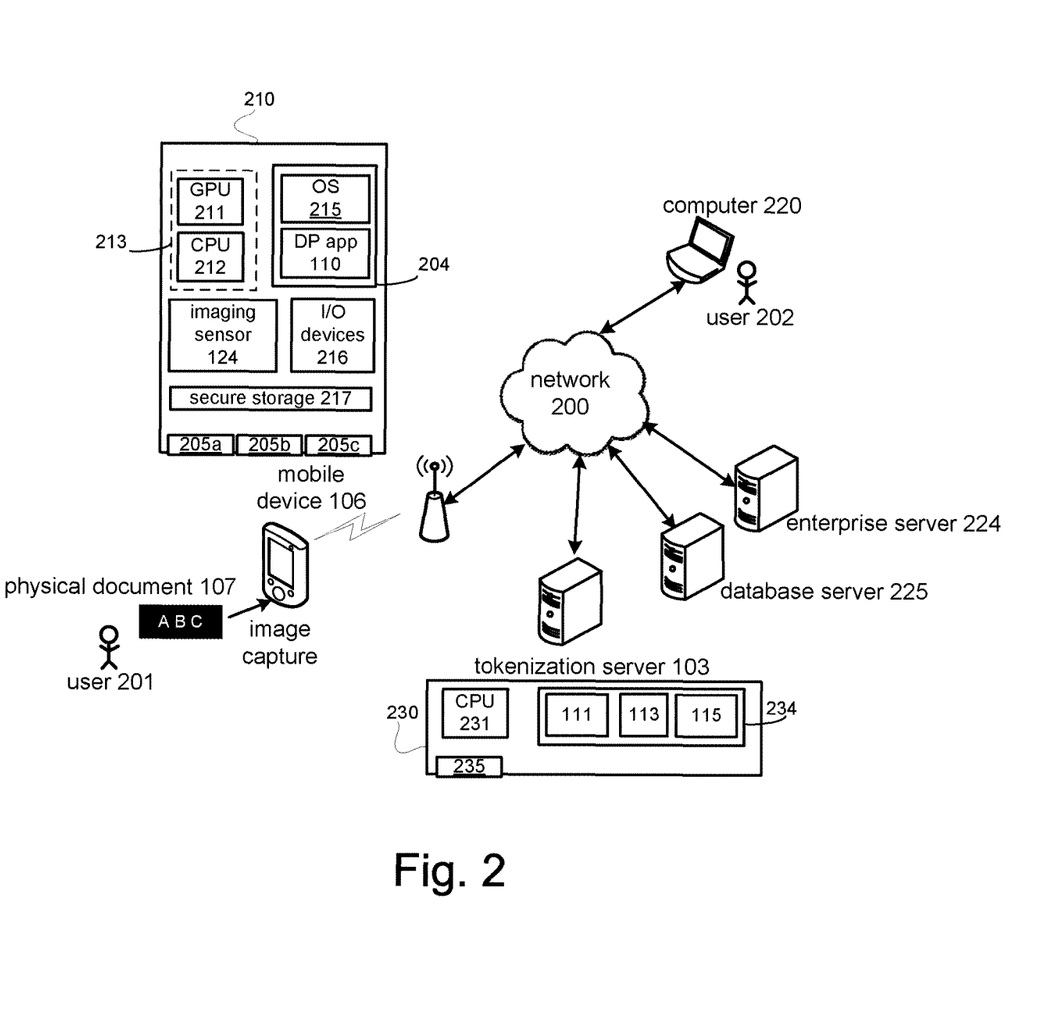
FIG. 2 illustrates components of the system, according to an example of the present disclosure.

FIG. 2 shows examples of components of the mobile device 106 and tokenization server 103, and further shows other computers that may be used in the system 100 which can be connected via network 200. The network 200 may include a wide area network (WAN), a local area network (LAN), public (e.g., Internet) or private networks, access network, wired or wireless network, or any suitable network.

Platform 210 includes components that may be used in mobile device 106. The mobile device 106 may include multiple interfaces 205, wired or wireless, for communicating with other devices. For example, interface 205a may be a cellular network interface, and 205b may be a Wi-Fi interface. Interface 205c may be a near-field communication (NFC) interface or a Bluetooth interface for short range communication.

The mobile device 106 includes a central processing unit (CPU) 212 and data storage 204. The CPU 212 for example is an integrated circuit. The CPU 212 may be a chipset with central processing unit and/or custom processing circuits, such as an application-specific integrated circuit (ASIC) or field-programmable gate array (FPGA). Graphics processing unit (GPU) 211 is an integrated circuit specialized for processing digital images, including the processing for identifying features in captured images of physical documents for tokenization and verifications. The CPU 212 may run an operating system (OS) 215 and applications, including document processing application 110. A digital image processing circuit 213 may comprise one or more of the GPU 211, CPU 112 or other special processing circuits that can perform digital image processing for operations described herein. The OS 215 and the applications are stored in data storage 204 which is a non-transitory computer readable medium. The mobile device 106 includes input/output (I/O) devices 216, such as keyboard, touch screen display, speaker, etc. The I/O devices 216 may include the display 123 and may provide audio, visual and/or tactile output to capture and display images and perform other operations. Secure storage 217 may be used to store the cryptographic function 121 and tokens. The secure storage 217 may include data storage that has limited accessibility through security protocols. The accessibility may limit the applications and processes that are able to access the data in the secure storage 217.

Platform 230 includes components that may be used in the tokenization server 103, such as CPU 312, data storage 234 including a non-transitory computer readable medium and interfaces 235. Functions or operations for tokenization 111, application update operations 113 and verification management 115 may be embodied as machine readable instructions executable by the CPU 312. The interfaces 235 may include a network interface, such as Ethernet, or other types of network interfaces, wired or wireless. The platforms 210 and 230 may include additional components not shown. In an example, the token database 119 may be hosted by database server 225. The database server 225 may handle tasks, such as tasks for storing data to the token database 119 and retrieving data from the token database 119.

In an example, user 201 of mobile device 106 captures an image of the physical document 107 using the mobile device 106. The image may be processed by the document processing application 110 or may be sent to the tokenization server 103 to process the image. The image processing may include identifying one or more features of the physical document 107 to generate a token for the physical document 107, and store the token in the token database 119 which may be hosted by the database server 215. Verifications may be performed, such as verifying validity and destruction of the physical document 107, prior to releasing the token to the user 201 to allow a transaction to be performed with the token.

For example, if the verification is for verifying a ticket is destroyed so it cannot be subsequently used, the verification may be sent to computer 220 and/or enterprise server 224 to complete a transaction that is conditioned upon the verification, such as transferring the ticket from user 201 to user 202. For example, the token for the ticket is transferred instead of the physical ticket. Another example of an action performed with a token may include verifying paper currency is destroyed and crediting a monetary value of the paper currency to the user's bank account by associating the token and a corresponding monetary amount of the paper currency with the user's bank account. Any number or type of actions may be performed with the tokens.

Figure 3:
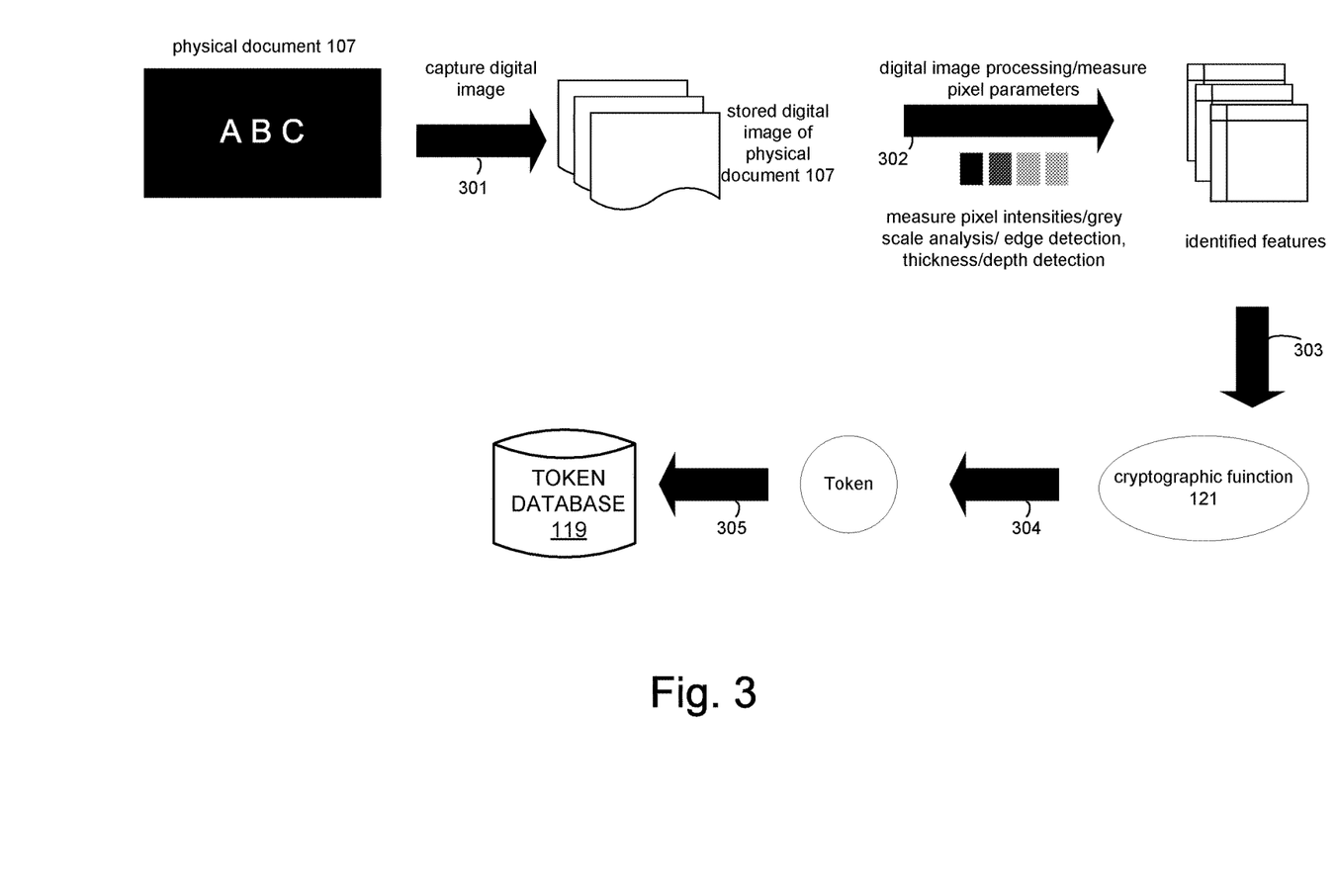
FIG. 3 illustrates a data flow diagram of operations to generate a token for a physical document, according to an example of the present disclosure.

FIG. 3 shows a data flow diagram for tokenization of physical document 107. At 301, an image of the physical document 107 is captured, for example, by the imaging sensor 124 of the mobile device 106, and stored. One or multiple images may be captured of the physical document 107 to generate token. The image capture may be invoked by the document processing application 110. For example, the document processing application 110 may be executed, and receive user input to start the image capture. The document processing application 110 may send an instruction to enter preview mode and capture an image in response to user input. The instruction may identify the camera, such as front or rear camera, and instruct to enter preview mode or capture the image. The captured image is stored. The image may be stored in the mobile device 106 for further processing and/or the image may be transmitted to the tokenization server 103 for further processing.

At 302, the image is digitally processed to identify features of the physical document 107. The image processing may include measuring pixel parameters for pixels in the image. One or more regions of pixels may be analyzed. For example, one or more regions of the image where the unique feature or other features should be located are analyzed, which includes measuring pixel parameters for the regions. In an example, if the unique feature is predetermined to be in the upper left corner or the middle of the physical document 107, then those regions are analyzed. Measured pixel parameters may include pixel intensities, grey scales, colors, reflectance, contrast, or other pixel parameters that can be used to further enhance the accuracy of the image capture and analysis operations.

A feature to be identified may be a unique feature. For example, a serial number "A B C" may be printed on the physical document 107. The image processing may include optical character recognition (OCR) to identify text or an alphanumeric code comprising the serial number. In this example, through OCR, the serial number "A B C" is identified. In other examples, the unique feature may be a marking, indicia, bar code, etc. Other features that may not be unique may be identified. For example, markings or indicia or codes that are common to all the physical documents in a set may be identified for verifying the validity or authenticity of the physical document. Additional features may include thickness, such as determined by shadows, machine-cut edges, folds, color, and dimensions may be determined or estimated through the image processing. In an example, the digital image processing may include running the digital images through a filter, such as a grey-scale converter, and pixel intensities are measured to detect edges and folds. For example, drastic changes in pixel intensity in predetermined regions (e.g., locations of the physical document 107) may be indicative of folds, tears and cuts. Furthermore, from the edge detection, a determination of whether the edge is a straight line (e.g., machine-cut or scissor cut edge) or a jagged edge (tear or a fold). Shadows may also be identified by change in pixel intensities and can be used to detect depth or thickness of the physical document 107 to verify its authenticity.

At 303, one or more of the identified features of the physical document 107 are applied to the cryptographic function 121 to generate the token at 304. The token may be stored in the token database 119 at 305. The cryptographic function 121 may include a function that generates an output that is practically impossible to invert or recreate without the cryptographic function. A hash function may be used as the cryptographic function 121. The unique feature may be provided as input to the cryptographic function 121. For example, the serial number is provided as input to the cryptographic function 121 to generate an output. The output may be converted to a digital value which is used as the token. In another example, the cryptographic function 121 may not use a feature from the image as input, but a feature may be applied as a nonce to the output. For example, the serial number may be appended to the end of the output of the cryptographic function 121 to generate the token.

Figure 4:
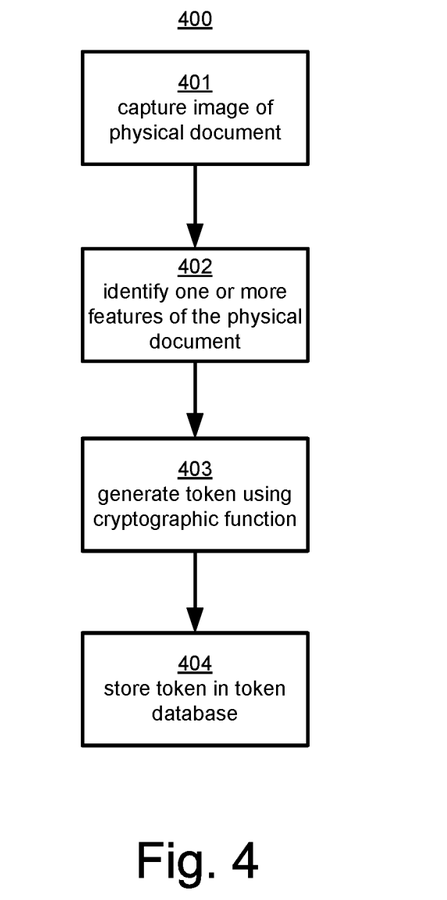
FIG. 4 illustrates a flow chart of a method for generating a token, according to an example of the present disclosure.

FIG. 4 illustrates a method 400 for generating a token for a physical document, according to an example of the present disclosure. The method 400 is described by way of example with respect to the system 100 shown in FIGS. 1-2. At 401, an image is captured of a physical document, such as the physical document 107. The mobile device 106 may be used to capture the image.

At 402, one or more features of the physical document 107 are identified from the image through digital image processing, which may include measurement of pixel parameters in one or more regions of the image. In an example, the document processing application 110 may identify the features. In another example, the image may be transmitted to the tokenization server 103 to identify the features. In yet another example, the features are identified by the document processing application 110, and transmitted to the tokenization server 103 for generating the token.

At 403, the cryptographic function 121 may be used to generate the token for the physical document 107. In an example, one or more of the identified features may be used as input to the cryptographic function 121 to generate the token.

At 404, the token may be stored in the token database 119. Additional information related to the physical document 107 may be stored with the token. For example, monetary value of the physical document (e.g., if the physical document 107 is currency), an owner of the physical document, the unique feature of the physical document, and an indication of verification that the physical document was destroyed and/or other information may be stored in the token database 119.

Figure 5:
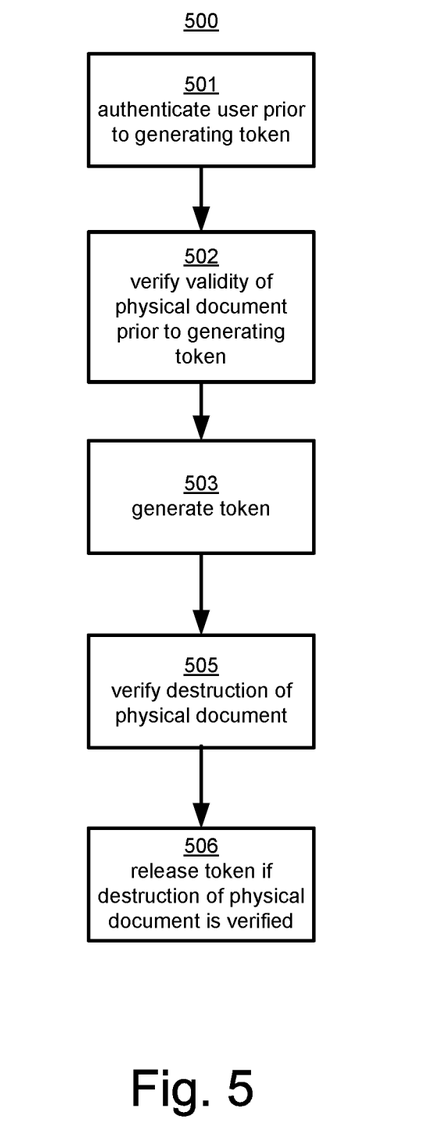
FIG. 5 illustrates a flow chart of a method for generating and releasing a token, according to an example of the present disclosure.

FIG. 5 illustrates a method 500 for generating and releasing a token, according to an example of the present disclosure. The method 500 is described by way of example with respect to the system 100 shown in FIGS. 1-2.

At 501, a user is authenticated prior to generating a token. For example, the user 201 launches the data processing application 110 on the mobile device 106, and the user 201 is prompted to enter a user identifier (ID) and password. This information may be sent to the tokenization server 103 to verify the user 201 is registered for converting physical document to tokens. If the user 201 is authenticated, then the user 201 may use the data processing application 110 to generate a token for the physical document 107, such as described above. If the user 201 is not authenticated, then the token may not generated.

At 502, a verification of the validity of the physical document 107 is performed prior to generating the token. For example, one or more features of the physical document 107 may be determined through the digital image processing discussed above to verify validity of the physical document 107. In an example, an identified feature is the document serial number. The serial number may be compared to a database of valid serial numbers to verify the validity of the physical document 107. If no match is found, then the physical document 107 may be considered as a counterfeit. In an example, markings or indicia or codes that are common to all the physical documents in a set may be identified for verifying the validity or authenticity of the physical document 107. Additional features that may be identified to verify the validity or authenticity of the physical document 107 may include thickness, such as determined by shadows, machine-cut edges versus man-made edges, colors, and dimensions. If the physical document 107 is not validated, then the token may not be generated.

At 503, the token is generated, for example, after authenticating the user and verifying the validity of the physical document 107. Token generation is discussed above with respect to the method 400 and other examples described herein.

At 505, destruction of the physical document is verified through image processing. In an example, the physical document 107 is modified after the image is captured for token generation. The modification of the physical document 107 may be performed to destroy the physical document 107 or otherwise render the physical document 107 unusable for its intended or desired purpose. The modification of the physical document 107 may be performed according to predetermined guidelines. An example of steps for modifying the physical document 107 that may be provided in the guidelines are as follows:

Step 1: Fold document in half across axis to create a rectangle (not diagonal to create a triangle);
Step 2: Fold document in half across other perpendicular axis to create a smaller rectangle;
Step 3: Tear complete document in half to produce two equal folded pieces;
Step 4: Place them on top of each other and make one more tear across the longest edge; and Step 5: Unfold and lay out the pieces for image capture and verification of document destruction.

The guidelines may be displayed on display 123 of the mobile device 106 so the user 201 can follow the steps and may be accompanied by an instructional video and/or images. The guidelines are followed to create the modified physical document. For example, the modified physical document includes folds and is broken into nine separate pieces. The nine separate pieces may be arranged as specified in the guidelines, then an image of the modified physical document, i.e., the arranged pieces, is captured for example using the imaging sensor 124 of the mobile device 106. The captured digital image is stored for example in the mobile device 106, and digital image processing is performed to measure pixel parameters and determine characteristics of the modified physical document. Examples of characteristics determined from the digital image processing may include determining number of pieces of the modified physical document, which is nine pieces in this example, identifying torn or cut edges, detecting shadows and depth, detecting folds, determining color, identifying markings, dimensions, etc. In an example, the digital visual processing may include running the digital images through a filter, such as a greyscale converter, and pixel intensities are measured to detect edges and folds. For example, drastic changes in pixel intensity in predetermined regions (e.g., locations of the modified physical document) may be indicative of folds, tears and cuts. Furthermore, from the edge detection, a determination of whether the edge is a straight line (e.g., machine-cut or scissor cut edge) or a jagged edge (tear or a fold). Shadows may also be identified by change in pixel intensities and can be used to detect depth or thickness of the modified physical document. If the characteristics are verified, the modified physical document may be considered destroyed.

Other examples are now described of pixel parameters and other characteristics of the digital images are determined. The pixel parameters may be measured for particular regions of the modified physical document, such as for different pieces or for different areas of the pieces associated with edges or folds. The pixel parameters may include variations of pixel intensities that are detected for edge detection, fold line detection, etc. In an example, the pixel parameters could be an average of pixel intensity for a group of pixels which can be compared to a pixel intensity for a pattern. In another example, a pixel-by-pixel comparison is performed based on pixel intensity. In an example, for grayscale images, the pixel intensity is a single number that represents the brightness of the pixel. The most common pixel format is the byte image, where this number is stored as an 8-bit integer giving a range of possible values from 0 to 255. In another example, for color images, pixel intensity is an integer value within the range 0 . . . 255 that specifies a color intensity for each color component (red, green and blue).

The system determines, from the pixel parameters and other document characteristics determined from the captured digital images, whether the modified physical document captured in the plurality of digital images is an actual physical document or a digitally created representation of a modified physical document. For example, markings, serial numbers, color, etc., is checked. Detection of document thickness and shadows may be used to identify the document is real. If the document is determined not to be an actual physical document, the verification ends and notification may be generated that the document is considered not to be an actual physical document.

Another example is described for determining validity of a document based on image-based shadow and cutline analysis. Identifying a cut line may include determining pixel intensities of pixels of an image of the modified physical document, and identifying pixel intensity differences that are representative of a material side and a shadow side of a cut line. By way of example, blocks of pixels are analyzed to identify a shadow side and a material side of the cut line. A shadow side may be identified by determining a region of the modified physical document that has a pixel intensity that is consistent over the region and that matches a predetermined shadow pixel intensity. For example, for greyscale images, the pixel intensity is a single number that represents the brightness of the pixel, such as an integer value between 0 and 255. A shadow pixel intensity may be a pixel intensity within a predetermined range that represents a shadow. A region of connected pixels that have pixel intensities that match the shadow pixel intensity may be identified as the shadow side of a cut line. Also, similarly, a region of connected pixels that have pixel intensities that match a predetermined material pixel intensity (which may be a range) may be identified as the material side of a cut line. A line of pixels between the shadow side and the material side is the cut line. Identified cut lines should match cut lines of the verification pattern. In an example, the general locations and pixel intensities of the material side and the shadow side are determined when creating the verification pattern. For example, a modified physical document is created according to a verification pattern, and one or more images are taken. Pixel intensities of the shadow side and the material side are determined and stored, and general locations of the cut lines are stored. Generally, pixel intensity should be greyer on the shadow side of the cut line as compared to the material side of the cut line.

In another example, identifying a cut line may be performed by comparing multiple images of the modified physical document. For example, a first image is taken of the modified physical document, and a second image is taken of the modified physical document that is different from the first image. For example, the modified physical document is moved in one or more directions and the second image is taken. Pixel intensities of the images are compared to identify the cut line. On the material side, the pixel intensities should remain the same. On the shadow side, the pixel intensities will be slightly different, in general due to increased shadow density, and around prominences and jagged edges where shadow can dramatically change. Additionally, standard geometric transforms to identify the movement that has taken place between image 1 and image 2. If the pixel intensity is identical across the images, it is likely that a flat copy (photocopy) has been used and retry strategies will be put in place to seek predetermined pixel intensity changes between images.

At 506, the token is released if the physical document 107 is verified as being destroyed. Releasing the token may include allowing the token to be used for a transaction or other operations, such as a monetary transaction or for entering an event if the physical document was a ticket to the event, etc. If the token is released, an indication may be stored in the token database 119 that the token is released. The released token may be transmitted to the mobile device 106 or to another computer to perform the transaction with the token. If destruction of the physical document 107 is not verified, the token may not be released until it is verified.

According to an example, the system 100 may be used to convert physical currency to tokens. For example, the physical document 107 may include paper currency that represents a monetary value, such as a dollar bill, and the system 100 may be used to tokenize the paper currency. The system 100 may convert the physical currency to tokens which digitally represents the value of the currency. For example, the information stored with the token in the token database 119 includes the value of the currency, and the value may be used to perform transactions.

For example, a holder of paper currency may give the currency to a merchant or use a mobile device, such as the mobile device 106 with document processing application 110, to convert the currency to a token, and the token and its value are stored in the token database 119, assuming the currency is authenticated. The user may subsequently enter into a transaction to deposit the token's monetary value into a bank account if the token is released, or may use the token to make a purchase, or may transfer the token to another person.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system to perform image-based tokenization, the system comprising:
   a memory storing a processing application comprising machine readable instructions;
   a processor that executes the stored processing application to:
      prompt a user via a display to capture a first image of a physical item;
      control an imaging sensor to capture the first image; and
      measure pixel parameters of pixels in a region of the captured first image to identify a unique feature of the physical item;
   a tokenization server to:
      receive the unique feature identified by the processing application;
      apply the unique feature to a cryptographic function to generate a token for the physical item;
      capture a second image of the physical item,
         the physical item rendered unusable for an intended purpose after a modification of the physical item;
      verify whether the physical item is rendered unusable for the intended purpose based on the captured second image of the physical item; and
      in response to the verifying that the physical item is rendered unusable for the intended purpose, release the token for use by the user; and
   a token database to store the token and information related to the physical item.

2. The system of claim 1, wherein the tokenization server is to:
   prior to generating the token, verify validity of the physical item based on at least one of the unique feature and another feature of the physical item identified through digital image processing of the captured first image,
   wherein the token is not generated if the validity of the physical item is not verified.

3. The system of claim 1, wherein the tokenization server is to:
   authenticate the user prior to releasing the token.

4. The system of claim 1, wherein the unique feature comprises at least one of a serial number, a bar code, and an indicia.

5. The system of claim 1, wherein the stored information related to the physical items comprises at least one of a monetary value of the physical item, an owner of the physical item, the unique feature of the physical item, and an indication of the verifying that the physical item was rendered unusable for the intended purpose.

6. A mobile device comprising:
   an imaging sensor;
   a display; and
   a document processing application executed by a processor to:
      prompt a user via the display to capture a first image of a physical document;
      control the imaging sensor to capture the first image of the physical document;
      measure pixel parameters of pixels in a region of the captured first image to identify a unique feature of the physical document;
      facilitate generation of a token for the physical document based on the unique feature;
      capture a second image of the physical document,
         the physical document rendered unusable for an intended purpose after a modification of the physical document;
      verify whether the physical document is rendered unusable for the intended purpose based on the captured second image of the physical document; and
      in response to the verifying that the physical document is rendered unusable for the intended purpose, release the token for use by the user.

7. The mobile device of claim 6, wherein to facilitate generation of the token, the document processing application is to:
   apply the unique feature to a cryptographic function to generate a token for the physical document; or
   send the unique feature to a tokenization server, wherein the tokenization server is to apply the unique feature to the cryptographic function to generate the token for the physical document.

8. The mobile device of claim 6, wherein the token is stored in a database of tokens generated for physical documents, and the database stores information related to the physical documents along with the tokens.

9. The mobile device of claim 8, wherein the stored information related to the physical documents comprises at least one of a monetary value of the physical document, an owner of the physical document, the unique feature of the physical document, and an indication of the verifying that the physical document was rendered unusable for the intended purpose.

10. The mobile device of claim 6, wherein the document processing application is to verify validity of the physical document based on the unique feature prior to generating the token, and
    the token is not generated if the validity of the physical document is not verified.

11. The mobile device of claim 6, wherein the document processing application is to authenticate the user prior to the release of the token for use by the user.

12. The mobile device of claim 6, wherein the unique feature comprises at least one of a serial number, a bar code, and an indicia.

13. A non-transitory computer readable medium comprising machine readable instructions executable by a processor to:
- determine at least one feature of a physical document from a first image of the physical document;
- determine validity of the physical document based on the at least one feature;
- generate a token for the physical document using a cryptographic function if the physical document is determined to be valid;
- capture a second image of the physical document,
  - the physical document rendered unusable for an intended purpose after a modification of the physical document;
- verify whether the physical document is rendered unusable for the intended purpose based on the captured second image of the physical document;
- in response to the verifying that the physical document is rendered unusable for the intended purpose, release the token for use by a user; and
- store the token and information related to the physical document in a token database.

14. The non-transitory computer readable medium of claim 13, wherein the machine readable instructions are executable by a processor to:
- authenticate the user prior to the releasing of the token.

15. The non-transitory computer readable medium of claim 14, wherein upon the releasing of the token, a transaction is operable to be performed with the released token.

16. The non-transitory computer readable medium of claim 13, wherein the at least one feature comprises a unique feature that uniquely identifies the physical document from other physical documents.

17. The non-transitory computer readable medium of claim 16, wherein to generate the token, the machine readable instructions are executable to:
- apply the unique feature as an input to the cryptographic function to generate the token.

* * * * *